United States Patent [19]

Onishi et al.

[11] Patent Number: 5,240,332
[45] Date of Patent: Aug. 31, 1993

[54] DYNAMIC PRESSURE BEARING DEVICE

[75] Inventors: Masayoshi Onishi, Sakai; Takeshi Takahashi, Yamatotakada, both of Japan

[73] Assignee: Koyo Seiko Co., Ltd., Osaka, Japan

[21] Appl. No.: 913,898

[22] Filed: Jul. 16, 1992

[30] Foreign Application Priority Data

Jul. 19, 1991 [JP] Japan ............... 3-56437[U]
Mar. 10, 1992 [JP] Japan ............... 4-11794[U]

[51] Int. Cl.⁵ .......................... F16C 32/06
[52] U.S. Cl. .................... 384/100; 384/115; 384/118; 384/119
[58] Field of Search ............ 384/291, 292, 293, 118, 384/119, 115, 113, 12, 100, 130, 132

[56] References Cited

U.S. PATENT DOCUMENTS

| | | | |
|---|---|---|---|
| 2,187,626 | 1/1940 | Merriman | 384/293 X |
| 2,680,259 | 6/1954 | Milk | 384/291 X |
| 3,238,000 | 8/1966 | Muijderman et al. | |
| 3,386,783 | 6/1968 | Scheufler | 384/291 |
| 3,655,248 | 4/1972 | Hirs | |
| 3,778,123 | 12/1973 | Hendler et al. | |
| 3,976,342 | 8/1976 | Leyendecker et al. | |
| 4,105,267 | 8/1978 | Mori | 384/291 |
| 4,491,373 | 1/1985 | Sugi et al. | 384/12 |
| 5,129,739 | 7/1992 | Asai et al. | 384/292 |

FOREIGN PATENT DOCUMENTS

| | | | |
|---|---|---|---|
| 167111 | 7/1988 | Japan | 384/100 |
| 3-12971 | 3/1991 | Japan | |
| 447863 | 3/1968 | Switzerland | |

*Primary Examiner*—Thomas R. Hannon
*Attorney, Agent, or Firm*—Wenderoth, Lind & Ponack

[57] ABSTRACT

A dynamic pressure bearing device has a bearing and a shaft which is partly accommodated in the bearing. A sliding surface of the bearing is provided with dynamic pressure grooves of circular shape. When the direction of relative movement between the shaft and the bearing is reversed, fluid within the dynamic pressure grooves can move its flowing direction change along the circular dynamic pressure grooves. Further, the dynamic pressure grooves, being of circular shape, can generate dynamic pressures of equal levels irrespective of the direction of the movement.

2 Claims, 3 Drawing Sheets

DYNAMIC PRESSURE BEARING DEVICE

BACKGROUND OF THE INVENTION

1. Field of the Invention

The present invention relates to a dynamic pressure bearing device which can generate a dynamic pressure upon relative movement between a shaft and a bearing in either a forward or a reverse direction.

2. Description of the Prior Art

Conventionally available dynamic pressure bearing devices of such a type as described above include one as shown in FIGS. 4 (a) and (b) (Japanese Utility Model Publication No. 12971/1991). FIG. 4 (a) is a cross sectional view in the axial direction of the dynamic pressure bearing device, and FIG. 4 (b) is a development view showing a sliding surface of the inner circumference of a bearing in the dynamic pressure bearing device.

This dynamic pressure bearing device has a column-shaped shaft 52 partly accommodated in a cylindrical bearing 51. Although not shown, oil as a lubricating fluid is charged between the bearing 51 and the shaft 52. Also, a plurality of rhombus dynamic pressure grooves 55 are provided to a sliding surface 53 of the inner circumference of the bearing 51 confronting the shaft 52, as shown in FIG. 4 (b).

Each of the rhombus dynamic pressure grooves 55 is positioned on the sliding surface 53 in such a manner that, of two orthogonal line segments L and M formed by joining the opposing vertexes of the rhombus dynamic pressure groove 55, one line segment L extends in the circumferential direction of the shaft 52 while the other line segment M extends in the axial direction of the shaft 52.

With the above dynamic pressure bearing device, when the shaft 52 rotates in a rotating direction A as shown by an arrow A in FIG. 4 (a), corner portions 60 of the dynamic pressure groove 55, which correspond to the rotating direction A, cause the oil between the bearing 51 and the shaft 52 to generate a dynamic pressure, thereby supporting the shaft 52 in the radial direction. On the other hand, when the shaft 52 rotates in a rotating direction B as shown by an arrow B in FIG. 4 (a), corner portions 70 of the dynamic pressure groove 55, which correspond to the rotating direction B, cause the oil between the bearing 51 and the shaft 52 to generate a dynamic pressure, thereby supporting the shaft 52 in the radial direction.

However, the above-described conventional dynamic pressure bearing device has had the following problems.

(1) When the shaft 52 is reversed in its rotating direction, the flow of the oil within the rhombus dynamic pressure grooves 55 will also be reversed. In this case, the oil is required to abruptly change its flowing direction at corners P and Q at which the corner portions 60 and 70 of a dynamic pressure groove 55 join together, as shown in FIG. 5 (a), which is a schematic view of the rhombus dynamic pressure groove 55. This can cause a less smooth oil flow, with the result that the dynamic pressure generated is likely to fluctuate.

(2) When the shaft 52 moves linearly in the axial direction while rotating, there may occur a case in which the direction of movement of the shaft 52 with respect to the dynamic pressure groove 55 becomes approximately orthogonal to grooves 60a and 70a which form two opposite sides of the rhombus dynamic pressure groove 55, as shown in FIG. 5 (b), which is a schematic view of the rhombus dynamic pressure groove 55. In this case, flow of the oil within the grooves 60a and 70a orthogonal with respect to the above-noted direction of movement would stagnate, fail to generate the dynamic pressure.

SUMMARY OF THE INVENTION

The object of the present invention is therefore to provide a dynamic pressure bearing device which can cause a flow of fluid within its dynamic pressure grooves to be smooth when the direction of relative movement between a shaft and a bearing is reversed and, moreover, which can generate dynamic pressures of approximately equal levels irrespective of the direction of movement.

In order to achieve the aforementioned object, there is provided a dynamic pressure bearing device, wherein a shaft is partly accommodated in a bearing, characterized in that: at least one of a sliding surface of the shaft confronting the bearing and a sliding surface of the bearing confronting the shaft is provided with dynamic pressure grooves of approximately circular shape for causing fluid between the bearing and the shaft to generate a dynamic pressure.

It is preferable that at both axial ends of the sliding surface of the shaft there are provided taper grooves that increasingly deepen toward axial outsides, respectively.

Since the above-mentioned dynamic pressure grooves are of approximately circular shape, they are able to generate dynamic pressures of approximately equal levels irrespective of the direction of relative movement between the bearing and the shaft with respect to the dynamic pressure grooves. Therefore, it is possible to generate dynamic pressures of approximately equal levels whatever the above-noted direction of movement is.

Meanwhile, when the direction of movement is reversed, the fluid within the dynamic pressure grooves will smoothly reverse its flowing direction along the dynamic pressure grooves of approximately circular shape. Therefore, the dynamic pressure generated can be prevented from fluctuating when the above-noted direction of movement is reversed.

Also, when the taper grooves are provided at both axial ends of the sliding surface of the shaft in such manner that the grooves increasingly deepen toward the axial outsides, respectively, the taper grooves serve as a fluid reservoir for the fluid between the bearing and the shaft while the fluid present in the taper grooves will ascend surfaces slanted upwardly toward the axial insides of the taper grooves by virtue of a centrifugal force applied to the fluid during the relative rotation between the bearing and the shaft. That is, the fluid at both axial ends of the sliding surface is made to move toward the axial insides, respectively, while the above-noted rotation is effected, so that the fluid can be suppressed from leaking out from between the bearing and the shaft, thus improving the sealing characteristic for the fluid.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 (b) is a development view showing a sliding surface of a bearing in the embodiment of FIG. 1(a);

FIG. 3 (b) is a development view showing a sliding surface of a bearing in the embodiment of FIG. 3a);

DETAILED DESCRIPTION OF THE PREFERRED EMBODIMENTS

The present invention will now be described in more detail by way of embodiments illustrated in the accompanying drawings.

Figure 1A:
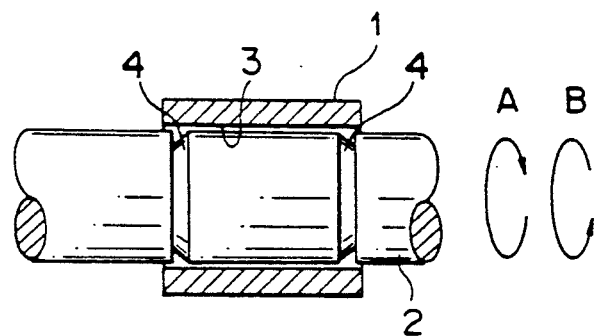
FIG. 1 (a) is a cross-sectional view showing an embodiment of a dynamic pressure bearing device according to the present invention.
Figure 1B:
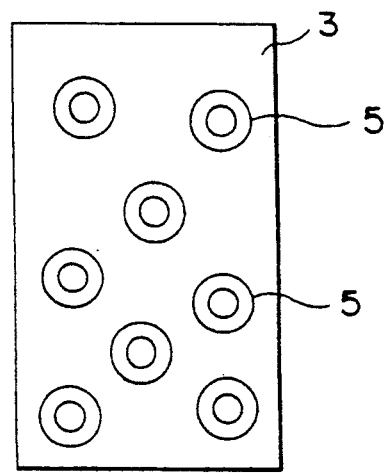

FIGS. 1 (a) and (b) show an embodiment of a dynamic pressure bearing device according to the present invention. The embodiment is so arranged that a column-shaped shaft 2 is partly accommodated in a cylindrical bearing 1. A sliding surface 3 of the inner circumference of the bearing 1 confronting the shaft 2 is provided with a plurality of circular dynamic pressure grooves 5, 5 ..., as shown in FIG. 1 (b). Between the bearing 1 and the shaft 2 is charged oil as a lubricating fluid (not shown).

Further, tapered grooves 4, 4 are provided at both axial ends of the sliding surface of the shaft 2 confronting the bearing 1 in such a manner that the grooves 4, 4 increasingly deepen toward axial outsides, respectively.

Figure 2:
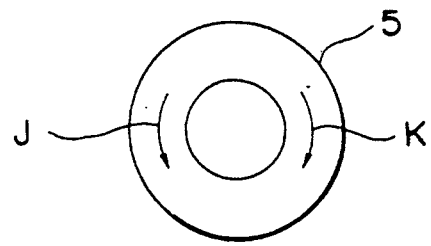
FIG. 2 is an enlarged view of a dynamic pressure groove of the embodiment of FIGS. 1(a) and 1(b)

In the above-described dynamic pressure bearing device, when the shaft 2 rotates in a rotating direction. A indicated by an arrow A in FIG. 1 (a), the dynamic pressure grooves 5 cause the oil within the dynamic pressure grooves 5 to form two flows in the same direction (see arrows J and K) as the direction indicated by the arrow A to make the oil generate a dynamic pressure as shown in FIG. 2, to support the shaft 52 in the radial direction.

In contrast, when the shaft 2 rotates in a rotating direction B indicated by an arrow B in FIG. 1 (a), the dynamic pressure grooves 5 cause the oil within the dynamic pressure grooves 5 to form two flows in the same direction as the direction indicated by the arrow B to make the oil generate a dynamic pressure, to support the shaft 2 in the radial direction.

When the rotating direction of the shaft 2 is reversed from the direction A to the direction B, or from the direction B to the direction A, the oil within the dynamic pressure grooves 5 can smoothly reverse its flowing direction along the circular-shaped dynamic pressure grooves 5. Accordingly, it is possible to prevent the dynamic pressure generated from fluctuating when the rotating direction is reversed.

Also, since the dynamic pressure grooves 5 are of circular shape, the grooves are capable of generating dynamic pressures of equal levels irrespective of the direction of relative movement between the bearing 1 and the shaft 2. Therefore, according to the present embodiment, it is possible to generate dynamic pressures of equal levels irrespective of whether the above-noted relative movement is either linear movement in the axial direction or a spiral movement. It is also possible to increase the degree of freedom for positioning the dynamic pressure grooves 5 in the sliding surface 3.

Moreover, since the tapered grooves 4, 4 are provided at both axial ends of the sliding surface of the shaft 2 confronting the bearing 1 in such a manner that the grooves 4, 4 increasingly deepen toward the axial outsides, respectively, the tapered grooves 4, 4 serve as oil reservoirs for, the oil between the bearing 1 and the shaft 2 and will allow the oil to ascent the surfaces which slope upwardly toward the axial insides of the tapered grooves 4, 4 by virtue of a centrifugal force applied to the oil during relative rotation between the bearing 1 and the shaft 2. That is, the oil at both axial ends of the sliding surface is made to move toward the axial insides during the above-noted relative rotation, so that the oil can be prevented from leaking out from between the bearing 1 and the shaft 2, to thereby improve the sealing characteristics for the oil.

Figure 3A:
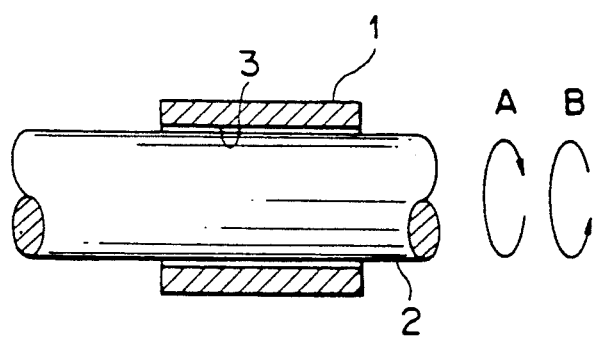
FIG. 3 (a) is a cross-sectional view showing another embodiment of a dynamic pressure bearing device according to the present invention.
Figure 3B:
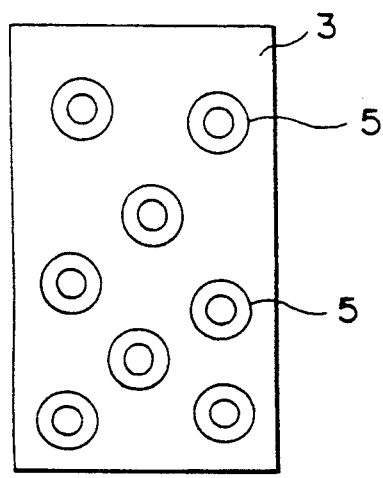
Figure 4A:
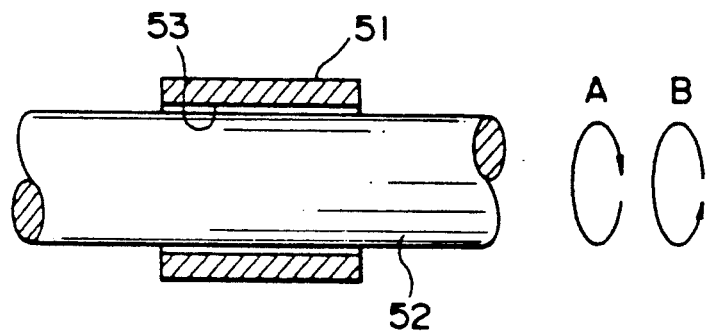
FIG. 4 (a) is a cross-sectional view showing a conventional dynamic pressure bearing device.
FIG. 4(b) is a development view showing a sliding surface of a bearing in the conventional dynamic pressure bearing device.
Figure 4B:
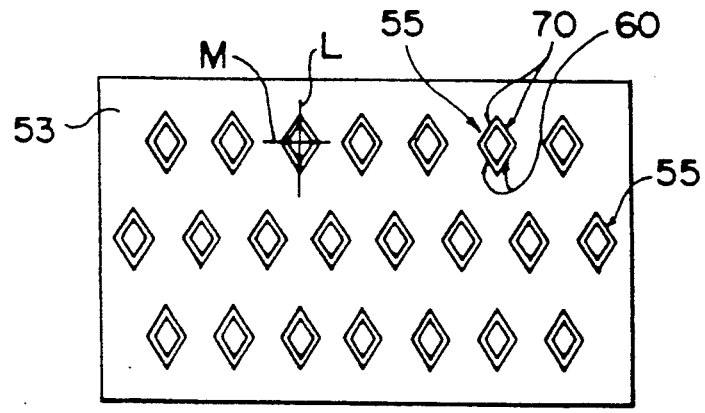
Figure 5A:
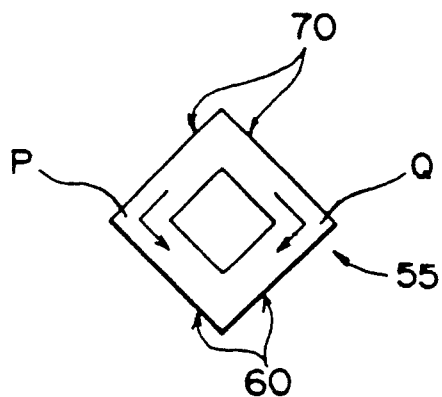
FIGS. 5 (a) and (b) are enlarged schematic views of the dynamic pressure groove of the conventional dynamic pressure bearing device.
Figure 5B:
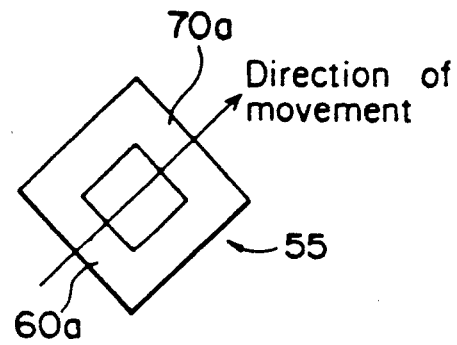

Alternatively, shown in FIGS. 3 (a) and (b) is a dynamic pressure bearing device in which no tapered grooves 4, 4 are provided in the shaft 2 as in the above-described embodiment.

Although the dynamic pressure grooves 5 of the above-described embodiment have been described as being circular in shape, they may also be elliptical in shape. Further, the dynamic pressure grooves 5, which have been provided in the sliding surface 3 of the bearing 1 in the embodiment, may alternatively be provided in the sliding surface of the shaft 2.

As apparent from the foregoing description, since the dynamic pressure bearing device of the present invention is arranged so that dynamic pressure grooves provided in at least one of a sliding surface of a shaft confronting a bearing and a sliding surface of the bearing confronting the shaft are of approximately circular shape, it is possible to generate dynamic pressures of approximately equal levels irrespective of the direction of relative movement between the bearing and the shaft with respect to the dynamic pressure grooves.

When the above-noted direction of movement is reversed, the fluid within the dynamic pressure grooves can smoothly reverse its direction along the approximately circular dynamic pressure grooves. Therefore, according to the present invention, it is possible to prevent the dynamic pressure generated from fluctuating when the direction of relative movement between the bearing and the shaft is reversed.

With tapered grooves provided at both axial ends of the sliding surface of the shaft such that they increasingly deepen toward the axial outsides, the tapered grooves serve as fluid reservoirs for the fluid, between the bearing and the shaft while the fluid is allowed to ascend the slanted surfaces which slope upwardly toward the axial insides of the tapered grooves by virtue of a centrifugal force applied to the fluid during the relative rotation between the bearing and the shaft. That is, the fluid at both axial ends of the sliding surface is made to move toward the axial insides during the above rotation, so that the fluid can be prevented from leaking out from between the bearing and the shaft, to thereby improve the sealing characteristics for the fluid.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dynamic pressure bearing device comprising:
   a bearing having a sliding surface;
   a shaft accommodated in said bearing and having a sliding surface confronting said sliding surface of said bearing; and
   wherein one of said sliding surface of said shaft and said sliding surface of said bearing is provided with a plurality of dynamic pressure grooves of approximately circular shape, said plurality of dynamic pressure grooves being distributed so as to be circumferentially and axially offset from one another in order to define a means for causing a fluid interposed between said shaft and said bearing to produce dynamic pressure to support said shaft relative to said bearing in all radial directions.

2. A dynamic pressure bearing device as recited in claim 1, wherein
   tapered grooves are respectively provided at opposing axial ends of said sliding surface of said shaft, each of said tapered grooves sloping in such a manner as to increasingly deepen toward axial outsides, respectively, of said shaft.

* * * * *